Nov. 16, 1954 J. E. HANSEN 2,694,341
FRAME CONSTRUCTION FOR EYEGLASSES, GOGGLES, AND THE LIKE
Filed Nov. 14, 1951 2 Sheets-Sheet 1
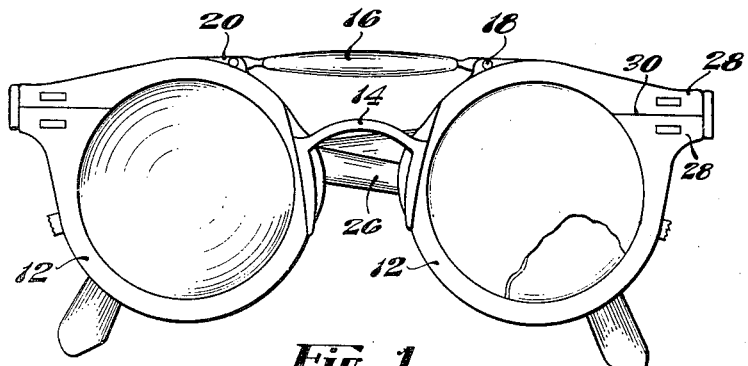
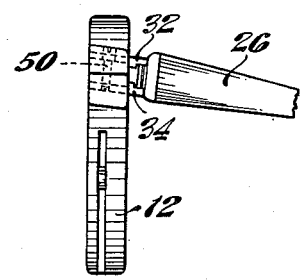
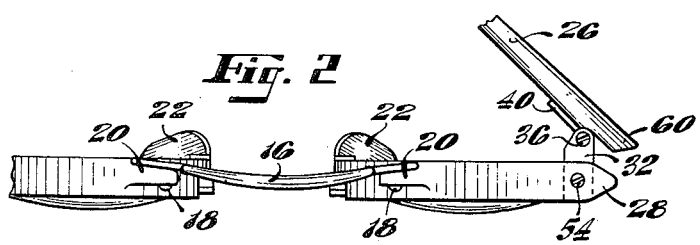
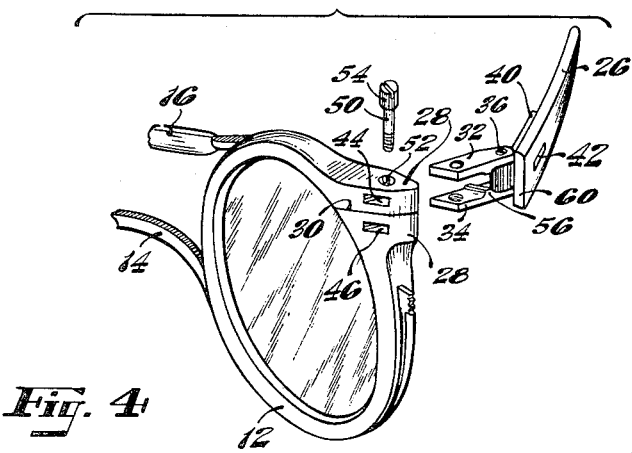
INVENTOR
JULIUS E. HANSEN
BY Kenway, Jenney, Witter
& Hildreth
ATTORNEYS Nov. 16, 1954 J. E. HANSEN 2,694,341
FRAME CONSTRUCTION FOR EYEGLASSES, GOGGLES, AND THE LIKE
Filed Nov. 14, 1951 2 Sheets-Sheet 2
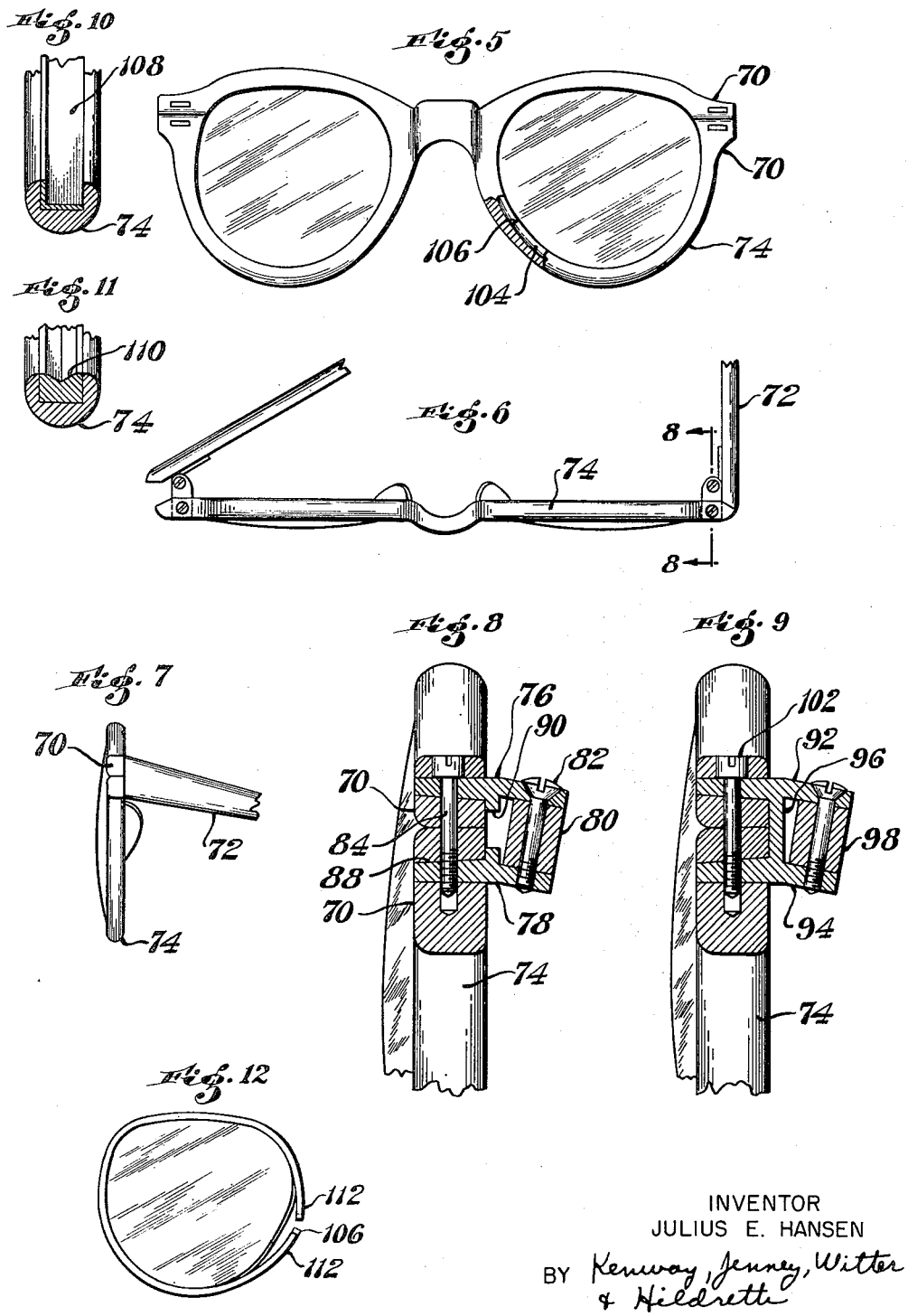
INVENTOR
JULIUS E. HANSEN
BY Kenway, Jenney, Witter
& Hildreth
ATTORNEYS

United States Patent Office 2,694,341
Patented Nov. 16, 1954

2,694,341

FRAME CONSTRUCTION FOR EYEGLASSES, GOGGLES, AND THE LIKE

Julius E. Hansen, Providence, R. I.

Application November 14, 1951, Serial No. 256,237

3 Claims. (Cl. 88—53)

The present invention relates to an eyeglass frame construction, and more particularly to a construction suitable for use with non-metallic frames for eyeglasses and goggles of both the single lens and the double lens type. The present application is a continuation-in-part of my copending application Serial No. 77,211, filed February 18, 1949, now abandoned.

While extensive use has been made of non-metallic or plastic eyeglass frames having a continuous rim or eyewire into which the lenses are snapped after the frame has been softened by heating, such construction is by no means completely satisfactory. Retention of the lens is not positive, replacement is difficult, and undesirable stresses are imparted to the lens. Indeed, lenses other than glass generally cannot be used, because of the optical distortions brought about by the strains set up within the material as a result of the constraint by the frame. To avoid the aforesaid difficulties, the present invention makes use of a frame construction wherein the frame at the region where the temple hinge is connected is divided or split, with the temple mounting serving to secure the frame. Thus, when the temple fitting is removed, the frame may be opened by separating the joint, so that the lens may easily be inserted or removed.

In such a construction, it is desirable that the temple attachment provide, in addition to the usual hinge connection to the frame, an effective clamping or securing action for the frame ends, so that no twisting or distortion of the frame occurs by reason of the temple connection. Also, it is desirable that the form of connection be such as to permit ready assembly and disassembly, to facilitate the mounting of lenses in the frame.

To this end, it is an object of the invention to provide an improved temple fitting or connection, wherein the fitting cooperates with the frame to provide rugged and durable connection, yet one which can readily be connected and disconnected.

More specifically, it is an object of the invention to provide a temple fitting wherein the non-metallic frame ends may be engaged and secured between relatively broad areas of the fitting, so that stress concentrations in the frame material are avoided.

Still another object of the invention is to provide a temple attachment which is unobtrusive in appearance, and does not require complicated elements.

The several features of the invention are illustrated in the accompanying drawings, in which Fig. 1 is a view in front elevation of a goggle embodying the improved frame construction; Fig. 2 is a top plan view of the same; Fig. 3 is a view in right side elevation showing the temple attachment; Fig. 4 is an oblique exploded view showing the temple fitting in partially disassembled relation; Figs. 5, 6 and 7 are front, top and side views, respectively, illustrating an eyeglass or goggle embodying a modified form of temple fitting; Figs. 8 and 9 are detail views, partly in section, illustrating said modified forms of temple fittings of the type employed in the eyeglasses or goggles of Figs. 5, 6 and 7; Figs. 10 and 11 are sectional details of reenforcing inner rim constructions suitable for use in eyeglasses and goggles having split frames; and Fig. 12 is a front view of a lens and rim prior to insertion in an opened frame.

Referring to the drawings, the glasses or goggles illustrated in the general views, Figs. 1 and 2, comprise lens-supporting eye wires or frames 12 which are joined by a bridge 14. A brow bar 16 may be employed for added strength, although its use is by no means essential.

The brow bar is shown as attached by small rivets 18 to lugs 20 projecting from the frame 12. Nose pieces 22 may be formed integrally with the frame, or separately formed and thereafter attached in accordance with usual practice.

The frame may be molded or otherwise formed of a suitable plastic material, preferably a composition that is light in weight and is not subject to distortion upon exposure to the normal range of temperature and humidity. The frame need not be of a plastic composition, however, but may be of light metal, if desired, as may the parts such as the bridge and brow bar.

To make possible an improved means of attachment for the temples 26 as hereinafter described, the frame is provided with enlarged laterally extending rim portions 28. These enlarged rim portions are split along a horizontal line 30 to permit the frame to be opened up for insertion or removal of the lens elements. As a result of this split frame construction, a relatively deep retaining groove may be provided in the rim, to insure positive retention of the lens elements when the split end of the frame is closed.

The improved temple attachment is best shown in the disassembled view, Fig. 4. Upper and lower straps 32 and 34 are connected by a screw 36 extending through the enlarged end of a plate 40 to provide a strong hinge construction. The plate 40 is secured to the temple 26 by conventional means indicated at 42. The straps 32 and 34 are received within rectangular openings 44 and 46 in the enlargement 28 of the frame, one slot being disposed above the line of separation 30 and the other slot below said line. To provide the proper angular relation between temple and frame, the slots may slope from front to back as shown in Fig. 3.

The straps 32 and 34, shown in Figs. 3 and 4, are secured within the slots, and at the same time the frame is firmly clamped together by a small bolt 50, the lower end of which screws into the bottom strap 34. An opening 52 in the frame permits the bolt head 54 to seat on the top strap 32, with the result that the clamping pressure is applied directly to the strap and thence to the frame. Advantageously, although not necessarily the inner faces of the strap may be provided with opposed projections 56 intermediate the ends of the straps. These projections serve as abutments that engage the rear of the frame when the straps have been inserted in and properly positioned within the slots.

Through the use of the straps with clamping screws joining the straps both front and rear, an extremely rugged temple attachment and hinge construction is made possible. At the same time, the split frame is held securely closed. Since the hinge pivot lies well to the rear of the frame, the inward end 60 of the temple may extend an appreciable distance beyond the pivot to limit outward swinging movement of the temple.

In the embodiment employed in the eyeglasses or goggles illustrated generally in Figs. 5, 6 and 7, the oblique disposition of the temple fitting within the frame ends 70 is not required, while still providing the proper angular relation between temple 72 and frame 74 (see Fig. 7).

In the detail view, Fig. 8, the temple attaching straps 76 and 78 extend through the frame ends 70 in a substantially horizontal direction, parallel to the line of separation. Rearwardly of the frame, the straps are directed downwardly at an angle, so as to engage the barrel 80 of the hinge with the pivotal axis normal to the direction of the temple. Screw 82 provides pivotal connection between straps and hinge, while screw 84 serves to secure the straps within the frame and at the same time bring the split frame firmly together. It will be observed that the head of the clamping screw 84 seats on the top strap 76 so that the clamping pressure is applied entirely between the straps and is therefore distributed over an appreciable area of contact with the frame.

A further feature of the strap construction shown in Fig. 7 is the tapering of the opposing faces of the strap ends at 88 to permit ready assembly in the goggle frame. By this construction the frame ends need not be brought into firm abutting contact in order to insert the straps in the apertures. As the straps are brought forwardly, however, the frame ends are automatically drawn toward one another so that upon full insertion of the straps, as limited by abutments 90, the straps are snug in the apertures, the frame ends are substantially in contact, and the holes in the straps are in proper registry to receive the clamping screw 84.

An alternative construction is shown in Fig. 9 wherein the upper and lower straps 92, 94 are embodied in a unitary construction having a joining member 96 which likewise serves as an abutment to engage the rear of the frame ends when the straps are in place. As in Fig. 8, the straps extend downwardly at an angle rearwardly of the frame, to permit mounting the temple, by means of hinge barrel 98, at the proper angle indicated generally in Fig. 7. By reason of the tapered opposing surfaces of the frame-engaging portions of the straps, the strap unit may readily be assembled in the goggle frame, after which the securing screw 102 may be inserted.

Each of the embodiments described provides a strong attachment, yet one which may readily be assembled and disassembled to permit removal and insertion of lenses. The split frame construction permits a relatively deep lens retaining groove to be employed, to insure positive retention of the lens without requiring appreciable pressure on the lens edge, such as results in the case of the forcibly snapped in lens in a non-separating frame.

In certain instances, however, it may prove desirable to provide isolation between the frame and the lens, for example when plastic lenses, particularly those of the type exhibiting birefringence when stressed mechanically, are employed. For such applications, an inner rim may be received within the frame groove, as indicated at 104 in Fig. 5. Such rim may be split, if desired, so as to allow the lens readily to be inserted. If split, the joint 106 should come at a point other than in the immediate vicinity of the split joint in the frame, in order that advantage may be taken of the bridging of the frame joint by the inner rim. Suitable shapes of inner rims are indicated at 108 in Fig. 10 and 110 in Fig. 11, the former of L-shaped section being suitable to receive lenses of normal thickness while the V-groove rim 110 is especially suited to mount relatively thick lenses.

In the case of relatively thick glass lenses, it may be found desirable to form the rim so that a slight force is required to bring the rim into complete engagement with the lens when the frame is closed on it, so as to resiliently embrace the lens. Thus, in Fig. 12, the ends 112 of the rim normally spring away from the lens, but may readily be urged into contact with the lens when the rim and lens are placed in the groove in the frame and the frame ends secured by the temple attachment.

I claim as my invention:

1. In an eyeglass or the like, a frame construction having split outer end portions, the frame in the region of the split being enlarged, apertures in the enlarged region above and below the split, said apertures extending through the frame from front to back, and temple attaching means comprising a pair of straps hingedly connected to the temple fitting and extending into the apertures in the frame, the portion of said straps within the frame being tapered from front to back to cause the frame ends to be drawn together upon insertion of the temple attaching means in the frame, and screw-threaded clamping means seated on the top strap and extending through the frame into the bottom strap.

2. In an eyeglass or the like, a frame construction having split outer end portions, the frame in the region of the split being enlarged, apertures in the enlarged region above and below the split, said apertures being substantially horizontal in the frame from front to back, and temple attaching means comprising a pair of straps hingedly connected at their rear to the temple fitting and extending forwardly into the apertures in the frame, the portion of said straps within the frame being tapered from front to back to cause the frame ends to be drawn together upon insertion of the temple attaching means in the frame, and a clamp screw extending through the frame from one strap to the other to clamp the straps in the frame, the attachment rearwardly of the frame being directed downwardly relative to the strap portions within the frame to support the temple at an angle to the horizontal, the pivotal axis of the hinge connection being disposed at an angle to the clamping screw within the frame.

3. In an eyeglass or the like, a frame construction having split outer end portions, the frame in the region of the split being enlarged, apertures in the enlarged region above and below the split, and temple-attaching means comprising a pair of straps hingedly connected at their rear to the temple fitting and extending forwardly into the apertures in the frame, the portion of said straps within the frame being tapered from front to back to cause the frame ends to be drawn together upon insertion of the temple attaching means in the frame, said straps rearwardly of the frame extending in a downward direction relative to the strap portions within the frame to support the temple at an angle to the frame, and means extending through the frame to secure the straps therein.

References Cited in the file of this patent

UNITED STATES PATENTS

| Number | Name | Date |
| --- | --- | --- |
| 1,578,528 | Kohler | Mar. 20, 1926 |
| 2,281,812 | Uhlemann et al. | May 5, 1942 |
| 2,521,632 | Hansen | Sept. 5, 1950 |

FOREIGN PATENTS

| Number | Country | Date |
| --- | --- | --- |
| 604,630 | France | May 10, 1926 |